US008491435B2

(12) United States Patent
Ghanime et al.

(10) Patent No.: US 8,491,435 B2
(45) Date of Patent: Jul. 23, 2013

(54) JOURNAL BEARING FOR USE IN EPICYCLICAL GEARBOX AND METHOD OF FACILITATING HYDRODYNAMIC OIL FLOW IN THE JOURNAL BEARING

(75) Inventors: George Hanna Ghanime, Ballston Spa, NY (US); Darren Lee Hallman, Scotia, NY (US); Changjie Sun, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 167 days.

(21) Appl. No.: 13/218,790

(22) Filed: Aug. 26, 2011

(65) Prior Publication Data

US 2013/0053202 A1 Feb. 28, 2013

(51) Int. Cl.
*F16H 57/04* (2010.01)
*F16H 57/08* (2006.01)

(52) U.S. Cl.
USPC .......................................... 475/159; 475/346

(58) Field of Classification Search
USPC .................... 475/156, 346; 384/322
See application file for complete search history.

(56) References Cited

U.S. PATENT DOCUMENTS

| | | | |
|---|---|---|---|
| 4,227,427 A | 10/1980 | Dick | |
| 5,102,379 A * | 4/1992 | Pagluica et al. | 475/331 |
| 5,531,653 A | 7/1996 | Barnholt | |
| 5,567,056 A | 10/1996 | Blase et al. | |
| 6,663,530 B2 * | 12/2003 | Poulin et al. | 475/331 |
| 7,748,292 B2 | 7/2010 | Takeuchi | |
| 7,789,793 B2 | 9/2010 | Koleoglou | |
| 7,861,827 B2 | 1/2011 | Madge et al. | |
| 7,866,444 B2 | 1/2011 | Aldridge | |
| 2002/0131657 A1 | 9/2002 | Inoue et al. | |
| 2007/0042859 A1 | 2/2007 | Bader | |
| 2008/0011115 A1 * | 1/2008 | Wakabayashi et al. | 74/467 |
| 2008/0159672 A1 * | 7/2008 | Barlerin et al. | 384/322 |
| 2010/0282007 A1 | 11/2010 | Haka | |

\* cited by examiner

*Primary Examiner* — Edwin A Young
(74) *Attorney, Agent, or Firm* — Scott J. Asmus

(57) ABSTRACT

A journal bearing for use in an epicyclical gearbox including a non-circular shaped journal pin and a journal bearing body into which the non-circular shaped journal pin is disposed. The non-circular shaped journal pin configured to mimic the shape of the non-cylindrical shaped journal bearing body at least at a high pressure point exerted upon the non-cylindrical shaped journal bearing body during a high pressure event, thereby permitting a free flow of a lubricating fluid there between the non-circular shaped journal pin and the journal bearing body during the high pressure event. An epicyclical gearbox including the journal bearing and method of facilitating a hydrodynamic oil flow in the planet gear journal bearing.

20 Claims, 5 Drawing Sheets

JOURNAL BEARING FOR USE IN EPICYCLICAL GEARBOX AND METHOD OF FACILITATING HYDRODYNAMIC OIL FLOW IN THE JOURNAL BEARING

BACKGROUND

The present application relates generally to journal bearings for use in gearboxes and more particularly relates to a bearing pin design for facilitating oil flow in a journal bearing of an epicyclical gearbox.

Gearboxes are used for power transmission in many systems such as, wind turbines, automobiles, aircraft and locomotives. A gearbox typically includes components such as a housing, shafts, bearings, and gears. Various gearbox designs are available to meet different speed transmission requirements. Of concern herein are epicyclical gear systems consisting of one or more outer gears, or planet gears, revolving about a central, or sun, gear.

Generally, epicyclical gearboxes are characterized as star-type, planetary type or differential type. In a star type gearbox, the carrier and bearing journal pin are fixed and the input torque/speed is through a sun gear shaft. The output torque/speed is through a ring gear and vice versa. In one particular example, it is known to use a star-type epicyclical gearbox in an aircraft to drive aircraft engine accessories in response to rotation of a rotor. It is also known that the planet gears of such a gearbox, and the bearings associated therewith, are subjected to high loads and thus suffer from high rates of wear under such demanding usage and do not provide ready accessibility for the maintenance, repair and replacement of these key wear components.

Gears, bearings, and shafts in a gearbox may have defects, may fail over time, or may simply wear out. These damaged or worn components may be replaced after the damaged or worn condition is detected. However, taking a gearbox out of service for such replacement typically results in revenue loss. Any failure of individual components affects the residual useful life (RUL) of the gearbox. Of particular interest with regard to maintenance of star-type epicyclical gearboxes is the flow of hydrodynamic oil within the gearbox bearings that serves to minimize or eliminate wear to the component parts. A lack of hydrodynamic lubricating fluid flow between the body of each of the bearing and the associated journal pin may result in a lack of lubrication within the bearing and planet gear that may result in direct contact between the journal pin and the journal bearing body. This direct contact may result in quickly wearing out the bearing.

Accordingly, there is need for a new and improved epicyclical gearbox in which lubrication of the component parts, and in particular an improved flow of hydrodynamic oil is provided within the bearing in an attempt to minimize or eliminate wear and tear on the gearbox bearings.

BRIEF DESCRIPTION

The present application is directed to an embodiment of a journal bearing for use in an epicyclical gearbox, the journal bearing including a non-circular shaped journal pin and a journal bearing body into which the non-circular shaped journal pin is disposed. The non-circular shaped journal pin mimicking the shape of the journal bearing body at least at a high pressure point exerted upon the journal bearing body during a high pressure event, thereby permitting a free flow of a lubricating fluid there between the non-circular shaped journal pin and the journal bearing body during the high pressure event.

The present application is further directed toward another embodiment of an epicyclical gearbox. The gearbox including a sun gear, a plurality of planet gears, a plurality of journal bearings, and a non-circular journal pin. The plurality of planet gears is positioned about the sun gear and in meshing relationship therewith. Each of the plurality of journal bearings rotatably supports one of the plurality of planet gears. Each of the plurality of journal bearings is configured to include a journal bearing body having a fixed arc shape and subject to deformation under a high pressure event. The non-circular journal pin is disposed at least partially within the journal bearing body. The planet carrier is configured in fixed relationship with each of the plurality of non-circular journal pins. Each of the plurality of non-circular journal pins is configured to mimic the fixed arc shape of each journal bearing body thereby permitting a free flow of a lubricating fluid there between during the high pressure event.

The present application further provides a method of facilitating a hydrodynamic oil flow in a planet gear journal bearing. The method including providing a fixed arc journal bearing body, disposing a non-cylindrical shaped journal pin proximate the fixed arc journal bearing body and providing an input lubricating fluid flow within the fixed arc journal bearing body. The non-circular shaped journal pin is configured to mimic the shape of the fixed arc journal bearing body at least at a high pressure point exerted upon the fixed arc journal bearing body during a high pressure event, thereby permitting a free flow of the input lubricating fluid there between the non-circular shaped journal pin and the fixed arc journal bearing body during the high pressure event.

These and other features and improvements of the present application will become apparent to one of ordinary skill in the art upon review of the following detailed description when taken in conjunction with the several drawings and the appended claims.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION

In a properly designed journal bearing system, friction between the journal pin and the journal bearing body is minimized via fluid dynamic effects, thereby minimizing, if not eliminating surface-to-surface contact between the journal pin and the journal bearing body. In a hydrodynamic bearing, such as the epicyclical star-type gear bearing described herein, the pressure in the lubricating fluid film is maintained by the rotation of the journal bearing body relative to the journal pin. The fluid lubrication results in a full-film or a boundary condition lubrication between the journal pin and the journal bearing body. Typically, this type of bearing system is more susceptible to wear because lubrication does not occur until there is a rotational effect between the journal pin and the journal bearing body. At low rotational speeds the lubrication may not attain complete separation between the journal pin and the journal bearing body. Under hydrodynamic conditions, or under high rotational speeds, a lubrication "wedge" forms that lifts the journal pin away from the journal bearing body. The journal bearing body or journal pin also slightly shifts relative to one another horizontally in a direction of rotation. Under the influence of a pinching pressure, as described herein, the lubrication "wedge" cannot form, causing the lubricating fluid flow to "whirl" around the journal bearing body and exit the journal bearing body. This results in a lack of lubrication within the bearing that may result in direct contact between the journal pin and the journal bearing body. This direct contact may result in quickly wearing out the bearing.

Figure 1:
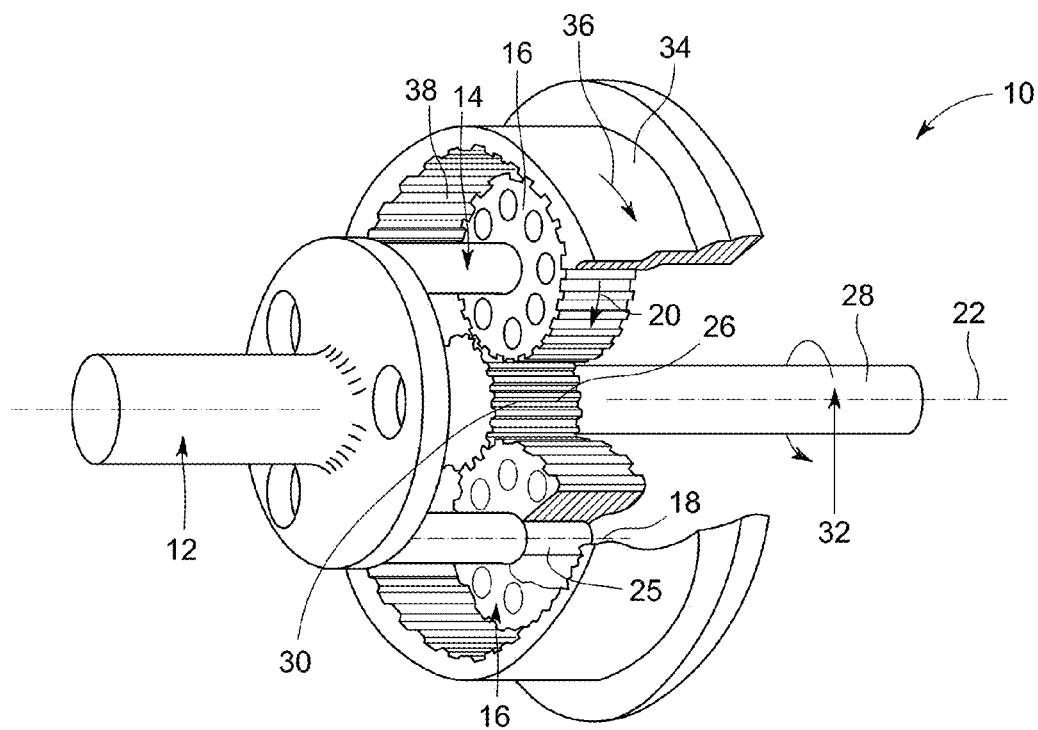
FIG. 1 is a partial cut-away illustration of a gearbox including a non-circular planet pin according to an embodiment as may be described herein.

Referring now to the drawings, in which like numerals refer to like elements through out the several views, illustrated in FIG. 1 is a partial cut-away view of a gearbox 10 including a non-circular carrier, or journal pin (described presently). The gearbox 10 is typically housed within a gearbox housing (not shown). The gearbox housing extends around and supports a planet carrier 12 in a fixed position relative to the housing. The planet carrier 12, and more particularly a plurality of journal bearings, each including a fixed journal pin 14 and a journal bearing body 24, are configured to support a plurality of planet gears 16 for orbital movement about a central axis 18 of each planet gear 16. The number of planet gears 16 is equal to the number of fixed journal pins 14. In the illustrated embodiment, therefore, two planet gears 16 are provided, although any number of planet gears may be included. The planet gears 16 are configured substantially larger in diameter than the fixed journal pins 14. Each one of the planet gears 16 has a plurality of external gear teeth 20 which, in the illustrated embodiment, are spur gear teeth.

In the illustrated embodiment, the two fixed journal pins 14 are provided spaced apart equally about a central axis 22 of the gear 10. A plurality of sliding type or roller type bearing bodies 25 support the fixed journal pins 14 for rotation relative to the planet gears 16. In the illustrated embodiment, the bearings 24 are configured as journal bearings. Specifically, a journal bearing body 25 is mounted proximate an end portion of the planet carrier 12, and more particularly the fixed journal pins 14, thereby engaging and supporting a first end of each journal pin 14 and supporting that end of the fixed journal pins 14 directly from the planet carrier 12.

The gearbox 10 also includes a single sun gear 26 mounted within the planet carrier 12, surrounded by the planet gears 16, and having formed as a part thereof a sun gear shaft 28. The sun gear 26 is radially supported by contact with the surrounding planet gears 16, for rotation of the sun gear 26, relative to the gearbox housing, about the central axis 22. The sun gear 26 may include a hollow bore (not shown) along its axis 22, and along the axis of a shaft extension (not shown) to conduct control wiring (not shown) through the gearbox 10. The sun gear 26 is configured substantially smaller in diameter than the planet gears 16.

The sun gear 26 has a plurality of external spur or helical gear teeth 30 that are in meshing engagement with the external gear teeth 20 on the planet gears 16. As a result, rotation of the sun gear shaft 28 about the axis 22, in response to an input rotational drive force 32 provided by an external device, causes the sun gear 26 to rotate about the central axis 22. The input rotational drive force 32 is thus entirely transmitted through the sun gear 26 to the planet gears 16, driving the planet gears 16 to each rotate about their central axes 18.

The gearbox 10 further includes a ring gear 34. The ring gear 34 is typically coupled to an external device (not shown), in a suitable manner, whereby the ring gear 34 is configured to exert a rotational output torque 36 thereon an external device (not shown). The ring gear 34 receives the input rotational drive force 32 from the sun gear shaft 28 that is translated via the sun gear 26 to rotate the planet gears 16 relative to the ring gear 22 in response to the input rotational drive force 32.

The ring gear 34 is configured to include an array of internal spur or helical gear teeth 38. The internal gear teeth 38 on the ring gear 34 are configured in meshing engagement with the plurality of external gear teeth 20 on each of the planet gears 16. As a result, orbital movement of the planet gears 16 about their own central axis 18, in response to rotation of the sun gear shaft 28 and sun gear 26 about the central axis 22, causes the ring gear 34 to rotate relative to the planet carrier 12. The input rotational drive force 32 transmitted from the external device to the sun gear shaft 28 is thus transmitted entirely to the ring gear 34.

During operation, input torque, and more particularly the input rotational drive force 32 is transmitted to the sun gear 26 and then split among the two planet gears 16 and thus among the two journal bearings 24, including the two bearing bodies 25 and the two journal pins 14, for transmission to the ring gear 34. This configuration spreads the high torque provided by the sun gear 26 among the planet gears 16. An input lubricating fluid, such as a lubricating oil, is supplied to lubricate the journal bearings 25. During operation, as the input rotational drive force 32, thus input torque, is applied to the sun gear 26, in a star configuration, the fixed journal pins 14 are stationary, while the planet gears 16 rotate about their own centers. In addition, the ring gear 34 will rotate opposite the rotation of the sun gear 26.

Figure 2:
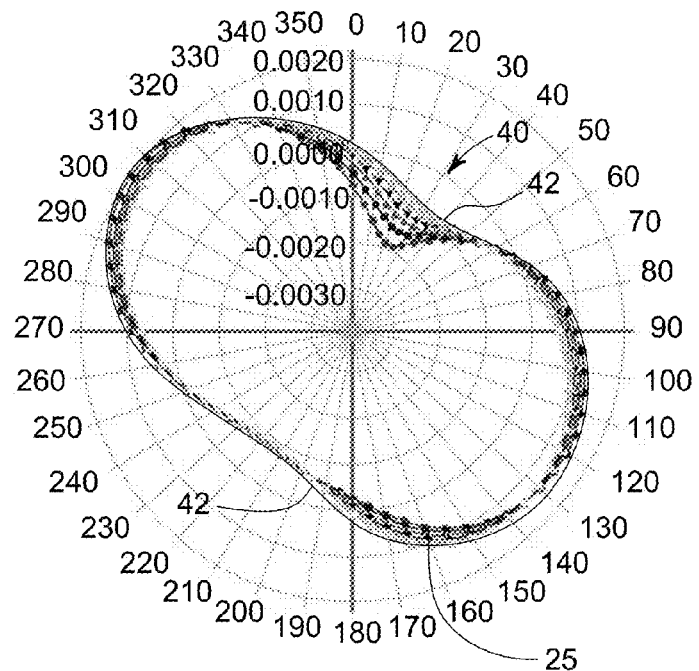
FIG. 2 is a graphical representation of an end view of the planet gear of FIG. 1 illustrating a pinching profile according to an embodiment as may be described herein.

As best illustrated in FIG. 2, in a combined graphical pinching profile and schematic of an end view of a journal bearing body 25 of FIG. 1, the combination of the input rotational drive force 32 (at the sun gear 26) and the rotational output force 36, thus output torque, at the ring gear 34 may result in a deformation of each of the planet gears 16 causing the planet gears 16, and more particularly each of the bearing bodies 25, resulting in a deformation of the bearing bodies 25 and pinching the associated journal pin 14 (not shown in FIG. 2) at points 42. Depending upon the rim thickness of each of the planet gears 16, the clearance between each of the journal pin's 14 outside diameter (OD) and the associated bearing bodies 25 inside diameter (ID) and thus planet gear 16 can become completely closed. This closure may potentially prevent the lubricating oil flow from reaching the highly loaded portion of each of the plurality of bearings 24. Instead of lubrication all portions of the journal bearings 24 and thus the planet gears 16, the lubricating oil flow will exit through the side of each of the planet gears 16 before reaching the loaded arc portion of each of the gears.

Figure 3:
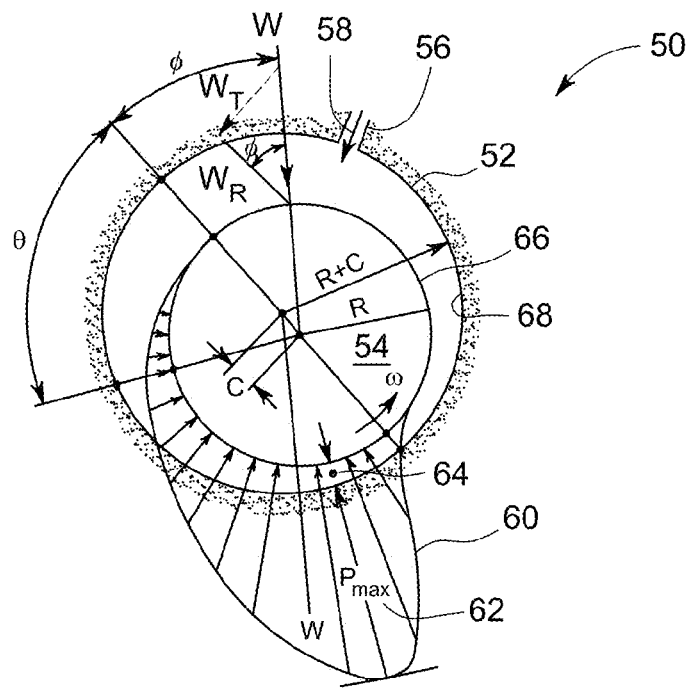
FIG. 3 is a graphical representation of an end view of a prior art journal bearing illustrating a typical bearing clearance and pressure profile as may be described herein.
Figure 4:
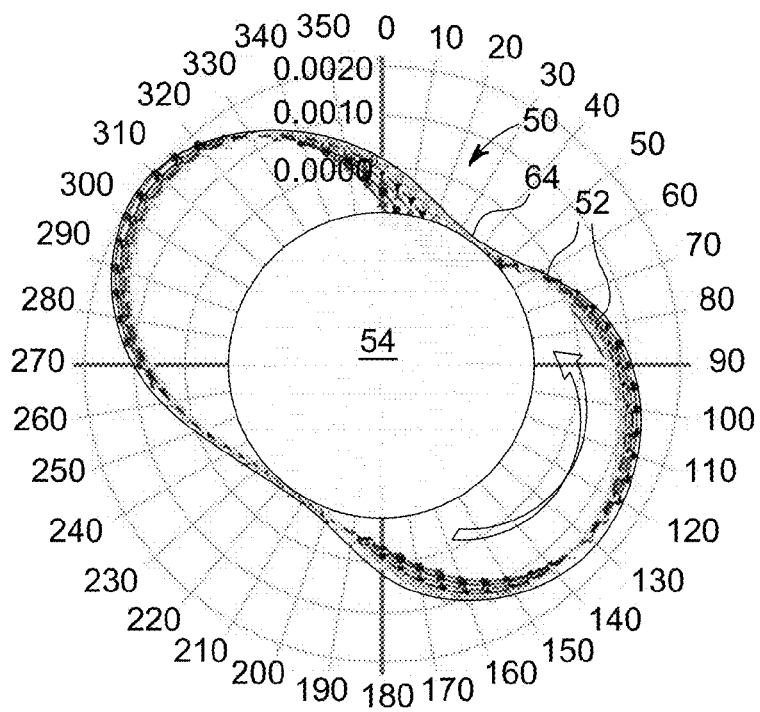
FIG. 4 is a graphical representation of an end view of the journal bearing of FIG. 3 illustrating a pinching profile according to an embodiment as may be described herein.

Referring now to FIGS. 3 and 4, illustrated in a combined schematic and graphical view are bearing clearance and pinching profiles of an end view of a single planet gear showing the previously described pinching deformation of the planet gear and journal bearing due to forces exerted upon the planet gear. Illustrated in FIG. 3 is a portion of a known epicyclical gear 50, and more particularly, a bearing comprising a journal bearing body 52 and a journal pin 54. The journal bearing body 52 has formed therein a lubricant supply opening 56, through which a lubricating fluid flow 58 is introduced into an interior of the journal bearing body 52. As schematically illustrated, during operation of gear 50, a circumferential pressure distribution profile 60 changes in light of forces exerted upon an associated planet gear (not shown) and thus the journal bearing body 52. More particularly, as illustrated, a maximum pressure ($P_{max}$) 62 is reached at a point 64 where a distance between an outside diameter (OD) 66 of the journal pin 54 is nearest an inside diameter (ID) 68 of the journal bearing body 52. The formation of the high pressure point 64 is due to the concave deformation of the gear 50 as a result of forces exerted thereupon. Due to this minimum distance between the journal bearing body 52 and journal pin 54, the lubricating fluid 58 is not able to flow beyond point 64 and lubricate the gear 50. FIG. 4 provides further illustration of the known gear 50 and the resultant deformation at point 64 and minimum flow passage for the lubricating fluid between the journal bearing body 52 and journal pin 54. As a result, the gear 50 is subject to wear.

Figure 5:
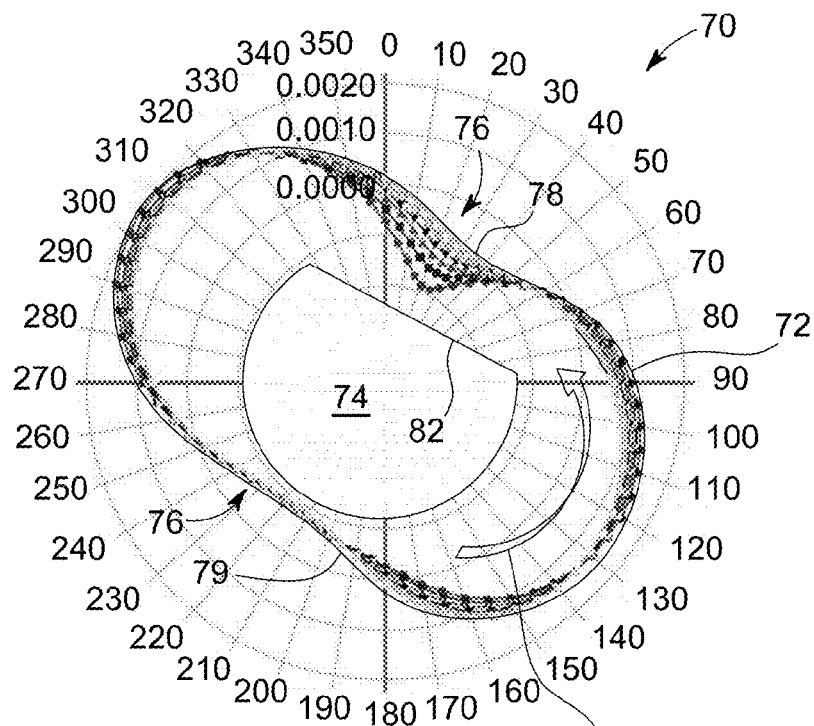
FIG. 5 is a graphical representation of an end view of a journal bearing illustrating a non-circular planet pin and an associated pinching profile according to an embodiment as may be described herein.

Referring now to FIGS. 5-9, illustrated are alternate embodiments of a journal bearing assembly for use in an epicyclical gear, such as gear 10 of FIG. 1 and method of facilitating hydrodynamic oil flow in the journal bearing. Illustrated is a plurality of bearing assemblies, each including a journal bearing body and a modified journal pin that permit a free flow of lubricating fluid flow there between. Various fixed arc bearings are well known in the art, including a full bearing or cylindrical journal bearing, an elliptical, or lemon shaped bearing, an offset bearing, a pressure dam bearing, a multi-lobe bearing, such as a three-lobe bearing, a four-lobe bearing, etc., and a tilting or pivoted-pad bearing. It is anticipated that the described modified journal pin may be incorporated into any such type of journal bearing assembly. Referring more specifically to FIG. 5, illustrated is a combined graphical pressure profile and cross sectional view taken through a journal bearing body and journal pin, such as journal bearing 24 of FIG. 1. More specifically, illustrated is a portion of a gearbox 70, including a bearing 71 comprised of a journal bearing body 72 and a journal pin 74, generally configured as a cylindrical fixed arc journal bearing. In the illustrated embodiment, the journal bearing body 72 is under the influence of an input rotational drive force, or torque, and thus exhibits radial deflection in the form of a deformation 76 at a plurality of points, or areas, 78 and 79. It is noted that an increase in pressure exerted upon the journal bearing body 72 and the journal pin 74 is noted at a plurality of axial locations, and specifically at points 78 and 79. A lubricating fluid flow 80 is present between the journal bearing body 72 and the journal pin 74. Referring more specifically to the journal pin 74, a modified journal pin is illustrated, being modified to permit a flow of the lubricating fluid flow 80 between the journal bearing body 72 and the journal pin 74. In that the journal pin 74 is fixed and does not rotate, the high pressure arc of the journal bearing body 72 is limited to one sector, or area 78, of the shaft diameter. More specifically, in the illustrated embodiment, the journal pin 74 includes a flat portion 82 where the high pinch pressure, at point 78, occurs, thus creating sufficient clearance to allow the lubricating fluid flow 80 to flow sufficiently to lubricate the planet gear, or the journal bearing body 72, inside diameter (ID) at the high pressure location 78. More specifically, the journal pin 74 is configured to include the flat portion 82, and thus substantially mimic the fixed-arc type bearing and simulate the same hydrodynamic behavior of the bearing.

Figure 6:
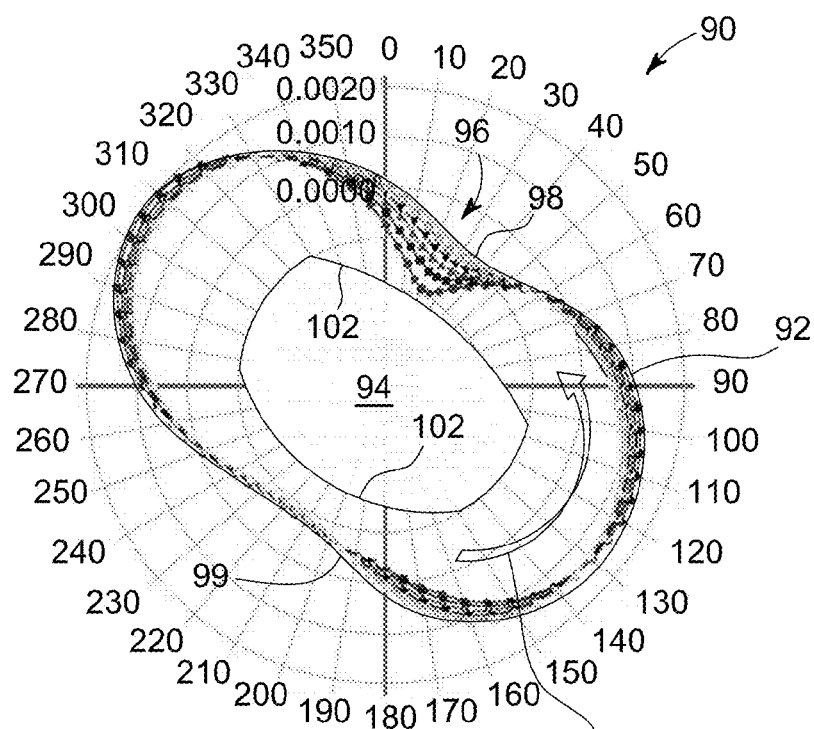
FIG. 6 is a graphical representation of an end view of a journal bearing illustrating a non-circular planet pin and an associated pinching profile according to another embodiment as may be described herein.

Referring now to FIG. 6, illustrated is a combined graphical pressure profile and cross sectional view taken through another journal bearing configuration, such as journal bearing 24 of FIG. 1. More specifically, illustrated is a portion of a gearbox 90, including a journal bearing body 92 and a journal pin 94, generally configured as an elliptical or lemon shaped fixed arc journal bearing 91. An elliptical or lemon shaped fixed arc bearing is characterized by a decrease in the clearance in one direction of the bore that increases the pre-load in the same direction. The elliptical, or lemon shaped, bearing is further characterized by a lower load carrying capacity, as compared to typical cylindrical bearing. In the illustrated embodiment, the journal bearing body 92 is under the influence of an input rotational drive force, or torque, and thus exhibits radial deflection in the form of a deformation 96 at a plurality of points 98 and 99. It is noted that, similar to the previously described embodiment, an increase in pressure exerted upon the journal bearing body 92 and the journal pin 94 is noted at a plurality of axial locations, and specifically at point 98. A lubricating fluid flow 100 is present between the journal bearing body 92 and the journal pin 94. Referring more specifically to the journal pin 94, a modified journal pin is illustrated, being modified to include a non-circular shape, thereby permitting a flow of the lubricating fluid flow 100 between the journal bearing body 92 and the journal pin 94. As previously described, in that the journal pin 94 does not rotate, the high pressure arc of the journal bearing body 92 is limited to substantially one sector of the pin diameter. In the illustrated embodiment, the journal pin 94 includes a plurality of shaped arc portions 102 where the high pinching pressure occurs, such as at points 98 and 99, thus creating sufficient clearance to allow the lubricating fluid flow 100 to flow sufficiently to lubricate the journal bearing body 92 and planet gear inside diameters (ID) at the high pressure locations. More specifically, the shaped portions 102 substantially configure the journal pin 94 to substantially mimic the fixed-arc type elliptical or lemon-shaped bearing shown and simulate the same hydrodynamic behavior of the elliptical or lemon-shaped bearing.

Figure 7:
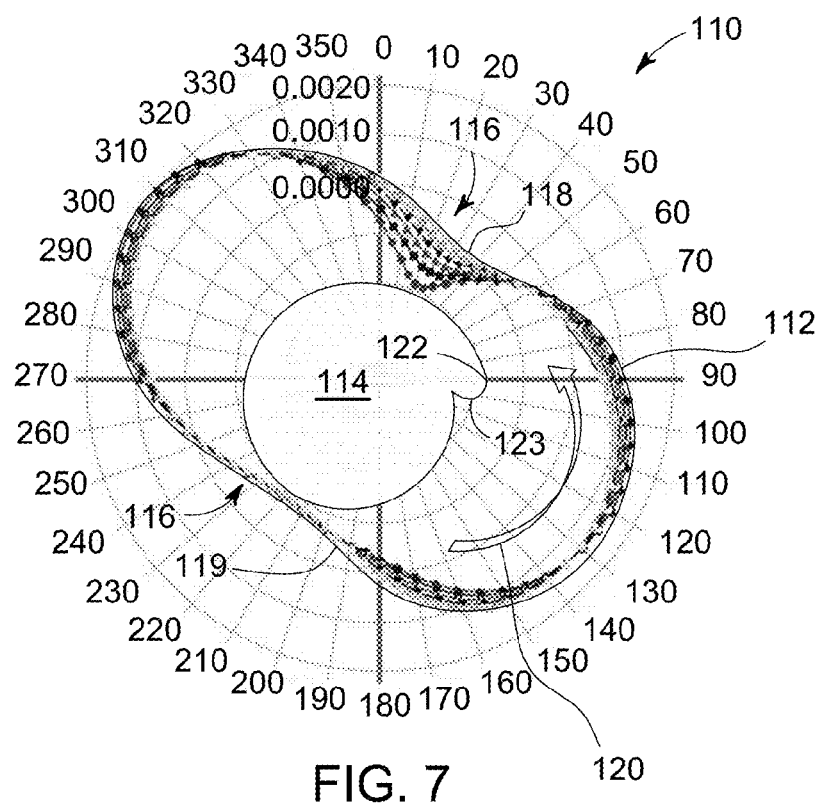
FIG. 7 is a graphical representation of an end view of a journal bearing illustrating a non-circular planet pin and an associated pinching profile according to another embodiment as may be described herein.

Referring now to FIG. 7, illustrated is a combined graphical pressure profile and cross sectional view taken through another embodiment of a journal bearing and journal pin configuration, such as journal bearing 25 and journal pin 14 of FIG. 1. More specifically, illustrated is a portion of a gearbox 110, including a journal bearing 112 and a journal pin 114, generally configured as a pressure dam shaped fixed arc journal bearing 111. In this type of bearing, a shallow relief cut, or groove, is formed in the center of the bearing over the top half of the bearing. The groove abruptly stops in order to create a downward force to stabilize the journal pin 114 and provide a bearing capable of withstanding a high load capacity. It is anticipated that similarly, journal bearing 112 could be shaped as an offset fixed arc journal bearing dependent upon design parameters. In the illustrated embodiment, the journal bearing 112 is under the influence of an input rotational drive force, or torque, and similar to the previously described embodiments, exhibits radial deflection in the form of a deformation 116 at a plurality of points 118 and 119. It is noted that, similar to the previously described embodiments, an increase in pressure exerted upon the journal bearing 112 and the journal pin 114 is noted at a plurality of axial locations, and specifically at points 118 and 119. A lubricating fluid flow 120 is present between the journal bearing 112 and the journal pin 114. Referring more specifically to the journal pin 14, a modified journal pin is illustrated, being modified to permit a flow of the lubricating fluid flow 120 between the journal bearing 112 and the journal pin 114. More specifically, the journal pin 114 is best described as a non-circular journal pin 114. As previously described, in that the journal pin 114 does not rotate, the high pressure arc of the journal bearing 112 is limited to one sector of the pin diameter. More specifically, in the illustrated embodiment, the journal pin 114 includes a shaped portion 122, in the form of a shallow relief cut, or groove 123, where the highest pinch pressure occurs, such as at point 118, thus creating sufficient clearance to allow the lubricating fluid flow 120 to flow sufficiently to lubricate the planet gear inside diameter (ID) at the high pressure location. The shaped portion 122 substantially configures the journal pin 114 to substantially mimic the fixed-arc type pressure dam shaped bearing shown and simulate the same hydrodynamic behavior of the pressure dam shaped bearing.

Figure 8:
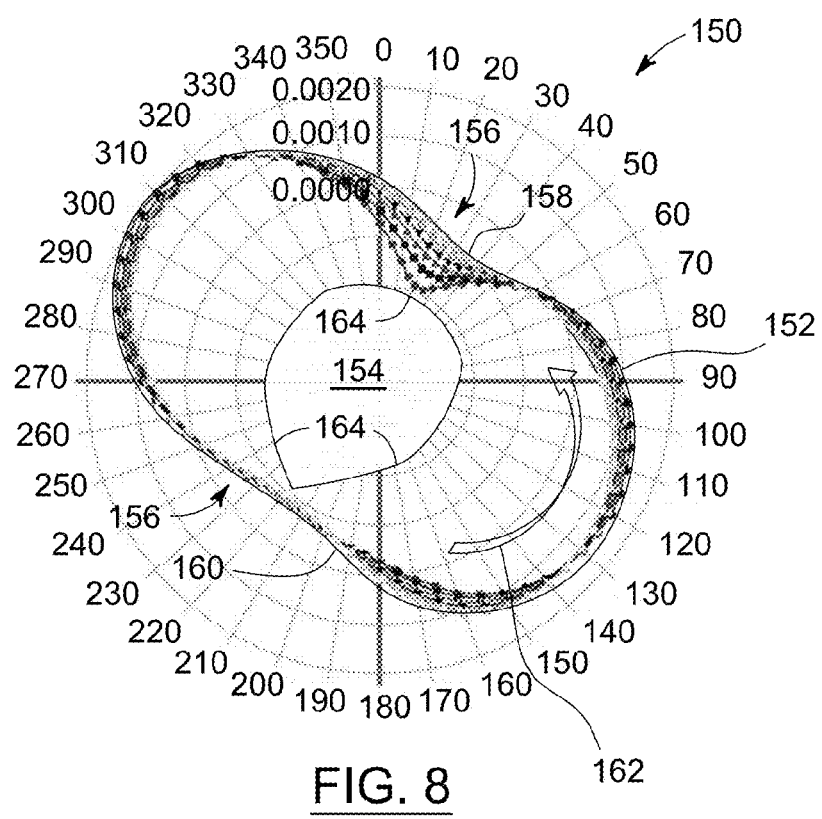
FIG. 8 is a graphical representation of an end view of a journal bearing illustrating a non-circular planet pin and an associated pinching profile according to another embodiment as may be described herein.

Referring now to FIG. 8, illustrated in a similar combined graphical pressure profile and cross sectional view is an embodiment of a gearbox including a non-circular journal pin, generally similar to the previously described embodiments. In this particular embodiment, illustrated is a portion of a gearbox 150 including a journal bearing 152 and a journal pin 154, generally configured as a multi-lobed fixed arc journal bearing 151. Although the illustrated embodiment includes a three-lobe configuration, a journal bearing including any number of lobes is anticipated by this disclosure and in accordance with design parameters. More particularly, illustrated is a portion of a gearbox 150, wherein the journal bearing 152 is under the influence of an input rotational drive force, or torque, and similar to the previously described embodiments, exhibits radial deflection in the form of a deformation 156 at a plurality of points 158 and 160. It is noted that, similar to the previously described embodiments, an increase in pressure exerted upon the journal bearing 152 and the journal pin 154 is noted at a plurality of axial locations, and specifically at points 158 and 160. A lubricating fluid flow 162 is present between the journal bearing 152 and the journal pin 154. Referring more specifically to the journal pin 154, a modified journal pin is illustrated, being modified to permit a flow of the lubricating fluid flow 162 between the journal bearing 152 and the journal pin 154. More specifically, the journal pin 154 is best described as a non-circular journal pin 154. As previously described, in that the journal pin 154 does not rotate, the high pressure arc of the journal bearing 152 is limited to one sector of the pin diameter. In the illustrated embodiment, the journal pin 154 includes a plurality of shaped portions 164 where the highest pinch pressures occur, such as at points 158 and 160, thus creating sufficient clearance to allow the lubricating fluid flow 162 to flow sufficiently to lubricate the planet gear inside diameter (ID) at the high pressure location. The shaped portions 164 substantially configure the journal pin 154 to substantially mimic the multi-lobed fixed-arc type bearing shown and simulate the same hydrodynamic behavior.

Figure 9:
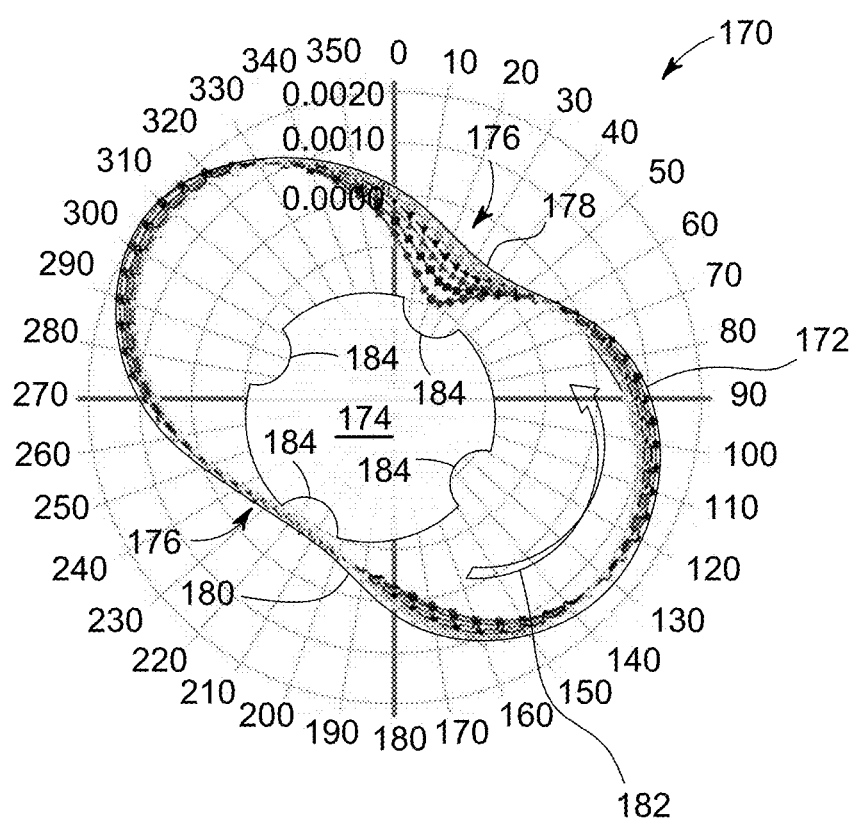
FIG. 9 is a graphical representation of an end view of a journal bearing illustrating a non-circular planet pin and an associated pinching profile according to another embodiment as may be described herein.

Lastly, illustrated in FIG. 9 in a combined graphical pressure profile and cross sectional view is another embodiment of a gearbox including a non-circular journal pin, generally similar to the previously described embodiments. In this particular embodiment, illustrated is a portion of a gearbox 170 including a journal bearing 172 and a journal pin 174, generally configured as a tilting, or pivoted-pad, fixed arc journal bearing 171. Although the illustrated embodiment includes a four arc cutout configuration, a journal bearing including any number of arced cutouts is anticipated by this disclosure. In a tilting pad, or pivoted-pad fixed arc journal bearing, multiple pads are included and designed to move with changing loads. Each pad is configured to pivot independently and substantially align with the curvature of the journal pin. The advantage of this bearing design is the more accurate alignment of the supporting journal bearing body 172 to the journal pin 174 during rotation and an increase in journal pin stability. Illustrated in FIG. 9 is a portion of a gearbox 170, wherein the journal bearing 172 is under the influence of an input rotational drive force, or torque, and thus exhibits radial deflection in the form of a deformation 176 at a plurality of points 178 and 180. It is again noted that, similar to the previously described embodiments, an increase in pressure exerted upon the journal bearing 172 and the journal pin 174 is noted at a plurality of axial locations, and specifically at points 178 and 180. A lubricating fluid flow 182 is present between the journal bearing 172 and the journal pin 174. Referring more specifically to the journal pin 174, a modified journal pin is illustrated, being modified to permit a flow of the lubricating fluid flow 182 between the journal bearing 172 and the journal pin 174. The journal pin 174 is again described as a non-circular journal pin 174. As previously described, the high pressure arc of the journal bearing 172 is limited to one sector of the pin diameter due to the journal pin 174 being stationary. In the illustrated embodiment, the journal pin 174 includes a plurality of shaped portions 184 in the form of arced cutouts, where the highest pinch pressures occur, such as at points 178 and 180, thus creating sufficient clearance to allow the lubricating fluid flow 182 to flow sufficiently to lubricate the journal bearing body 172 and planet gear inside diameter (ID) at the high pressure locations. The shaped portion 182 substantially configures the journal pin 174 to substantially mimic the tilted, or pivoted-pad fixed-arc type bearing shown and simulate the same hydrodynamic behavior.

Accordingly, provided is a non-circular journal pin for use in a journal bearing of an epicyclical gearbox in which the non-circular journal pin is configured to mimic the shape of the journal bearing body structure and permit the free flow of a lubricating fluid between the non-circular journal pin and the journal bearing body. The free flow of the lubricating fluid thereby provides sufficient lubrication to the journal bearing body and the associated planet gear. The non-circular journal pin is configured to remain stationary and include at least one shaped portion proximate at an at least one high pressure point within the bearing. The non-circular journal pin may be configured to include a flat shaped portion, elliptical shaped portions, an offset shaped portion, multi-lobed arc shaped portion, arc shaped cutout portions, or some other shaped portion or portions that permits the journal pin shape to mimic the shape of the journal bearing and thereby provides for the free flow of lubricating fluid within the bearing.

While the disclosure has been described with reference to a plurality of exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A journal bearing for use in an epicyclical gearbox, the journal bearing, comprising:
   a non-circular shaped journal pin; and
   a journal bearing body into which the non-circular shaped journal pin is disposed,
   wherein the non-circular shaped journal pin mimics the shape of the journal bearing body at least at a high pressure point exerted upon the journal bearing body during a high pressure event, thereby permitting a free flow of a lubricating fluid there between the non-circular shaped journal pin and the journal bearing body during the high pressure event.

2. The journal bearing of claim 1, wherein the high pressure event is in response to a rotational drive force imparted on the journal bearing body.

3. The journal bearing of claim 2, wherein the non-circular shaped journal pin comprises a flat portion positioned proximate the high pressure point.

4. The journal bearing of claim 1, wherein the journal bearing body comprises a lemon-shaped fixed arc journal bearing body.

5. The journal bearing of claim 4, wherein the journal pin includes a plurality of shaped arc portions positioned proximate a plurality of high pressure points exerted on the lemon-shaped fixed arc journal bearing body thereby mimicking the shape of the lemon-shaped fixed arc journal bearing body.

6. The journal bearing of claim 1, wherein the journal bearing body comprises a pressure dam shaped fixed arc journal bearing body.

7. The journal bearing of claim 6, wherein the non-circular shaped journal pin comprises a pressure dam shaped portion positioned proximate a high pressure point exerted on the pressure dam shaped fixed arc journal bearing body thereby mimicking the shape of the pressure dam shaped fixed arc journal bearing body.

8. The journal bearing of claim 1, wherein the journal bearing body comprises a multi-lobed fixed arc journal bearing body.

9. The journal bearing of claim 8, wherein the non-circular shaped journal pin comprised a multi-lobed fixed arc shape thereby mimicking the shape of the multi-lobed fixed arc journal bearing body.

10. The journal bearing of claim 1, wherein the journal bearing body comprises a pivoted-pad fixed arc journal bearing body.

11. The journal bearing of claim 10, wherein the non-circular shaped journal pin includes a plurality of arced cutouts positioned proximate at least one high pressure point exerted on the pivoted-pad fixed arc journal bearing body thereby mimicking the shape of the pivoted-pad fixed arc journal bearing body.

12. An epicyclical gearbox, comprising:
   a sun gear;
   a plurality of planet gears positioned about the sun gear and in meshing relationship therewith;
   a plurality of journal bearings, each rotatably supporting one of the plurality of planet gears, each of the plurality of journal bearings configured to include a journal bearing body having a fixed arc shape and subject to deformation under a high pressure event and a non-circular journal pin disposed at least partially within the journal bearing body; and
   a planet carrier configured in fixed relationship with each of the plurality of non-circular journal pins,
   wherein each of the plurality of non-circular journal pins is configured to mimic the fixed arc shape of each journal bearing body thereby permitting a free flow of a lubricating fluid there between during the high pressure event.

13. The epicyclical gearbox of claim 12, wherein the high pressure event is in response to a rotational drive force imparted on the journal bearing body.

14. The epicyclical gearbox of claim 12, wherein the non-circular shaped journal pin comprises a flat portion positioned proximate the high pressure point.

15. The epicyclical gearbox of claim 12, wherein the journal bearing body comprises a lemon-shaped fixed arc journal bearing body and the non-circular shaped journal pin includes a plurality of shaped arc portions positioned proximate a plurality of high pressure points exerted on the lemon-shaped fixed arc journal bearing body thereby mimicking the shape of the lemon-shaped fixed arc journal bearing body.

16. The epicyclical gearbox of claim 15, wherein the shaped journal bearing body comprises a pressure dam shaped fixed arc journal bearing body and the non-circular shaped journal pin comprises a pressure dam shaped portion positioned proximate a high pressure point exerted on the pressure dam shaped fixed arc journal bearing body thereby mimicking the shape of the pressure dam shaped fixed arc journal bearing body.

17. The epicyclical gearbox of claim 12, wherein the shaped journal bearing body comprises a multi-lobed fixed arc journal bearing body and the non-circular shaped journal pin comprised a multi-lobed fixed arc shape thereby mimicking the shape of the multi-lobed fixed arc journal bearing body.

18. The epicyclical gearbox of claim 12, wherein the shaped journal bearing body comprises a pivoted-pad fixed arc journal bearing body and the non-circular shaped journal pin includes a plurality of arced cutouts positioned proximate at least one high pressure point exerted on the pivoted-pad fixed arc journal bearing body thereby mimicking the shape of the pivoted-pad fixed arc journal bearing body.

19. A method of facilitating a hydrodynamic oil flow in a planet gear journal bearing, the method comprising:
   providing a fixed arc journal bearing body;
   disposing a non-cylindrical shaped journal pin proximate the fixed arc journal bearing body; and
   providing an input lubricating fluid flow within the fixed arc journal bearing body,
   wherein the non-circular shaped journal pin is configured to mimic the shape of the fixed arc journal bearing body at least at a high pressure point exerted upon the fixed arc journal bearing body during a high pressure event, thereby permitting a free flow of the input lubricating fluid there between the non-circular shaped journal pin and the fixed arc journal bearing body during the high pressure event.

20. The method of claim 19, wherein the high pressure event is in response to a rotational drive force imparted on the non-cylindrical shaped journal bearing body.

* * * * *